United States Patent
Liu et al.

(10) Patent No.: US 8,523,457 B2
(45) Date of Patent: Sep. 3, 2013

(54) OPTICAL-FIBER CONNECTOR WITH ACCURATE MEASURING REFERENCE

(75) Inventors: Hsu-Chih Liu, Tu-Cheng (TW); Yen-Chih Chang, Tu-Cheng (TW); Chun-Fu Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 502 days.

(21) Appl. No.: 12/909,835

(22) Filed: Oct. 22, 2010

(65) Prior Publication Data

US 2011/0096323 A1    Apr. 28, 2011

(51) Int. Cl.
*G02B 6/38* (2006.01)
*G02B 6/36* (2006.01)

(52) U.S. Cl.
USPC ............... 385/74; 385/70; 385/71; 385/89; 385/93

(58) Field of Classification Search
USPC .................... 385/70, 71, 74, 89, 93
See application file for complete search history.

(56) References Cited

U.S. PATENT DOCUMENTS

| | | | | |
|---|---|---|---|---|
| 6,287,017 B1 * | 9/2001 | Katsura et al. | | 385/59 |
| 7,118,285 B2 * | 10/2006 | Fenwick et al. | | 385/57 |
| 7,306,380 B2 * | 12/2007 | Yamazaki | | 385/88 |
| 7,344,315 B2 * | 3/2008 | Fenwick et al. | | 385/55 |
| 7,553,088 B2 * | 6/2009 | Nakajima | | 385/64 |
| 7,693,362 B2 * | 4/2010 | Fenwick et al. | | 385/14 |
| 7,874,739 B2 * | 1/2011 | Fenwick et al. | | 385/71 |
| 8,075,197 B2 * | 12/2011 | Chen | | 385/74 |
| 8,235,601 B2 * | 8/2012 | Chang et al. | | 385/74 |
| 8,240,925 B2 * | 8/2012 | Wu | | 385/71 |
| 8,256,972 B2 * | 9/2012 | Wu | | 385/93 |
| 8,292,515 B2 * | 10/2012 | Liao et al. | | 385/74 |
| 8,388,236 B2 * | 3/2013 | Wu | | 385/74 |
| 8,403,567 B2 * | 3/2013 | Yu et al. | | 385/74 |
| 2003/0113077 A1 * | 6/2003 | Xu et al. | | 385/93 |
| 2004/0067015 A1 * | 4/2004 | Nakajima | | 385/33 |
| 2004/0184738 A1 * | 9/2004 | McColloch et al. | | 385/53 |
| 2006/0068629 A1 * | 3/2006 | Nakajima | | 439/378 |
| 2010/0150502 A1 * | 6/2010 | Fenwick et al. | | 385/54 |
| 2011/0008004 A1 * | 1/2011 | Liao et al. | | 385/74 |
| 2011/0026882 A1 * | 2/2011 | Budd et al. | | 385/52 |
| 2011/0075975 A1 * | 3/2011 | Wang et al. | | 385/78 |
| 2011/0085762 A1 * | 4/2011 | Liu et al. | | 385/55 |
| 2011/0091160 A1 * | 4/2011 | He et al. | | 385/74 |
| 2011/0091161 A1 * | 4/2011 | He et al. | | 385/74 |
| 2011/0096323 A1 * | 4/2011 | Liu et al. | | 356/73.1 |
| 2011/0103747 A1 * | 5/2011 | Chang et al. | | 385/76 |
| 2011/0116746 A1 * | 5/2011 | Chen | | 385/74 |
| 2011/0222820 A1 * | 9/2011 | Wu | | 385/89 |
| 2011/0222823 A1 * | 9/2011 | Pitwon | | 385/93 |
| 2012/0008901 A1 * | 1/2012 | Yu et al. | | 385/74 |
| 2012/0076458 A1 * | 3/2012 | Lin | | 385/74 |

* cited by examiner

*Primary Examiner* — Rhonda Peace
(74) *Attorney, Agent, or Firm* — Wei Te Chung; Ming Chieh Chang

(57) ABSTRACT

An optical-fiber connector includes an insulative main body having a pair of optical components extending forwardly therefrom. Each optical component defines at least one lens and a guiding post located at outside of the lens. Each guiding post defines a through hole extend through the guiding post and the main body in a front-to-back direction and fulfilled with the air for transmitting a test light. The test light from the through hole of the guiding post acts as an accurate measuring reference of the true position between the lens and the fiber because of having no displacement of the light path through a through hole.

13 Claims, 4 Drawing Sheets

OPTICAL-FIBER CONNECTOR WITH ACCURATE MEASURING REFERENCE

BACKGROUND OF THE INVENTION

1. Field of the Invention

The present invention generally relates to an optical-fiber connector, and more particularly, to a novel structure of an optical-fiber connector for improving true position between fibers and the lenses.

2. Description of Related Art

An optical-fiber connector includes a main body defining a plurality of lens at a front face thereof and a plurality of fibers cable secured in the main body from a back-to-front direction. True positions between the lenses and the fibers must be test during manufacturing of the connector since light transmission is greatly influenced by the true positions between the lenses and the fibers. Optical projecting method is generally used to test the true position in industry. A test light passing through the main body functions as a measuring reference or a datum line which is used to test the true positions of the fibers and lenses. As known, the test light will refract during the main body, i.e., shifting a predetermined datum line, thereby shifting the true positions of the fibers and lenses. Thus, an optical-fiber connector with an accurate measuring reference is desired to overcome the disadvantages of the related art.

Hence, the present invention is directed to solving this problem in the related art.

SUMMARY OF THE INVENTION

An object of the invention is to provide an optical-fiber connector which has an accurate measuring reference.

In order to achieve the object set forth, an optical-fiber connector includes an insulative main body having a pair of optical components extending forwardly therefrom. Each optical component defines at least one lens and a guiding post located at outside of the lens. Each guiding post defines a through hole extend through the guiding post and the main body in a front-to-back direction and fulfilled with the air for transmitting a test light. The test light from the through hole of the guiding post acts as an accurate measuring reference of the true position between the lens and the fiber because of having no displacement of the light path through a through hole.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
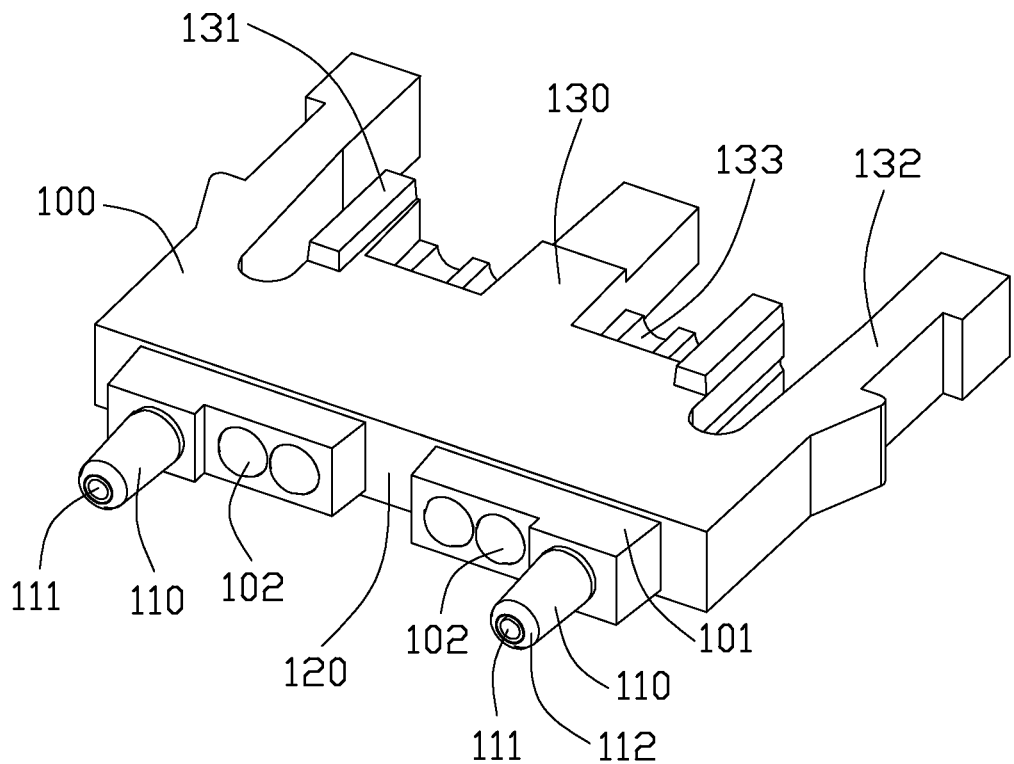
FIG. 1 is a perspective view of an optical-fiber connector of a first embodiment of the present invention.
Figure 2:
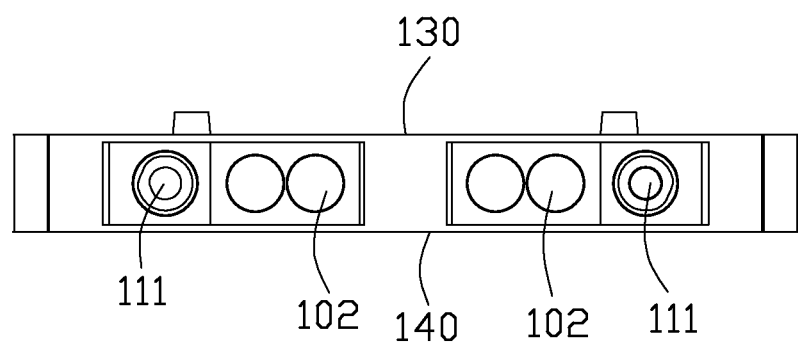
FIG. 2 is a front side view of the optical-fiber connector as shown in FIG. 1.

Referring to FIGS. 1 and 2, an optical-fiber connector 10 for improving signals transmission in accordance with an embodiment of the present invention comprises an insulative main body 100 having a front face 120, a top face 130 adjacent to the front face 120 and a bottom face 140 opposite to the top face 130.

Referring to FIGS. 1 and 2, the main body 100 defines a pair of separated optical components 101 extending forwardly from the front face 120. Each optical component 101 is of an L-shape cross section from the top view and integrate with a first section and a second section side by side. A plurality of lens 102 non-spherically bulges forwardly from the first section of the optical component 101 and a pair of guiding post 110 extends forwardly from the second section of the optical component 101. The guiding post 110 is located at an outside of the lens 102. The lens 102 intends to couple with fiber cable (not shown) for transmitting high speed optical signals. The main body 100 has a pair of guiding blocks 131 projecting upwardly from the top face 130 and extending along the front-to-back direction for guiding the optical-fiber connector 10 to be assembled in the cavity of device in which the connector is disposed. A pair of spring arms 132 is located at two sides of the main body 100 and extends rearward from the two sides of the main body 100. A plurality of receiving slots 133 corresponding to the lenses extend along back-to-front direction for retaining the fiber cables (not shown).

The fiber cable has a fiber end (not shown) in the vicinity of the front face 120 which is must be aligned with the lens 102 so that the light in the fiber cable can arrive to the counter connector by refraction of the light lines through the lens 102. The optical-fiber connector 10 needs a measuring reference of optical projecting to ensure the true position between the lens and the fiber. Each guiding post 110 defines a face 112 at a free end thereof and a through hole 111 extending from the face 112 to the optical component 101 until a rear face of the main body 100 for transmitting the test light. The through hole 111 extends through the main body 100 between the receiving slot 133 and the spring arm 132. The through hole 111 is round from the front view. The centre of the through hole 111 and the centre of the guiding post 110 are overlapped (refer to FIG. 2). The test light from the through hole 111 acts as a measuring reference to accurate the true positions of the lenses and the fiber ends. The accuracy of the true positions is greatly improved because of no reflaction or little reflection to the test light through the air in the through hole.

Figure 3:
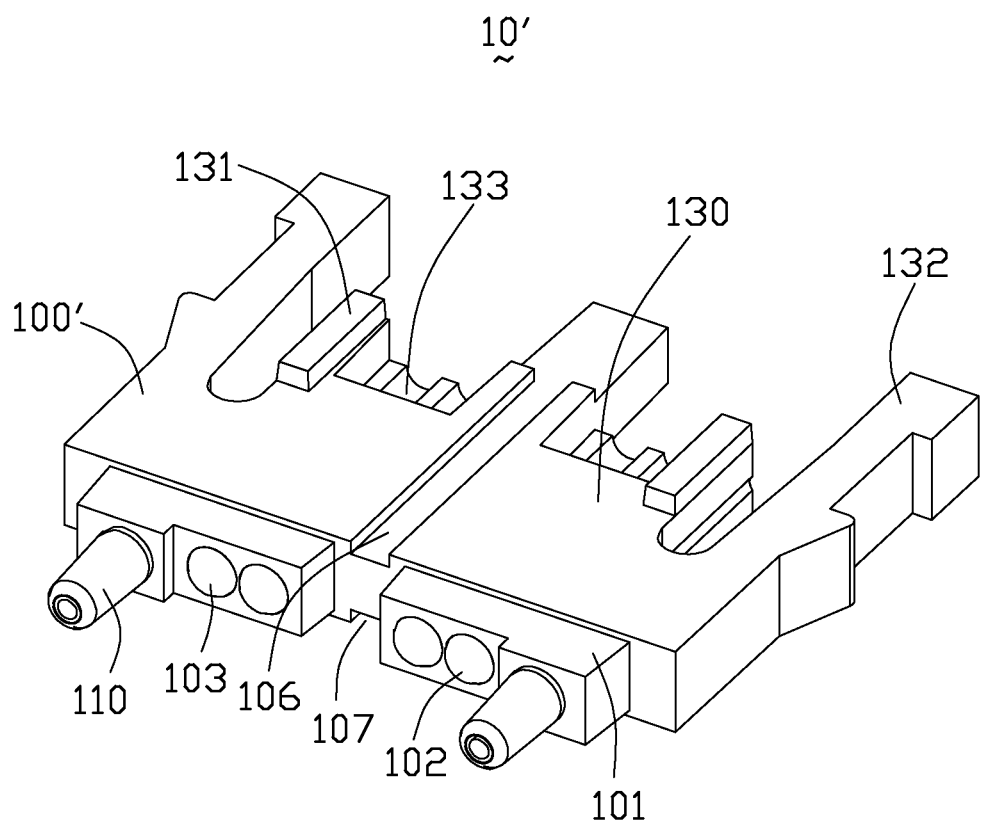
FIG. 3 is a perspective view of an optical-fiber connector of a second embodiment of the present invention.
Figure 4:
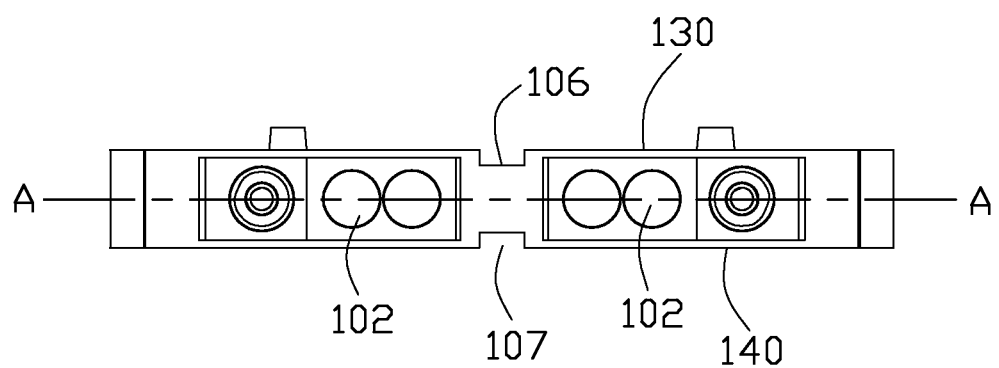
FIG. 4 is a front side view of the optical-fiber connector as shown in FIG. 3.

Referring to FIGS. 3 and 4, an optical-fiber connector 10' of a second embodiment is generally same as the first optical-fiber connector 10 about the main structures. But the main body 100' of the second optical-fiber connector 10' defines a first through slot 106 extending through the main body 100' along the front-to-back direction and located between the pair of optical components 101. The first through slot 106 recess downwardly from the top face 130 of the main body 10' and is a right-angle slot directed with three edges (refer to FIG. 4). The main body 10' also defines a second through slot 107 opposite to the first through slot 106 and recessing upwardly from the bottom face 140 of the main body 10'. The first through slot 106 and the second through slot 107 are symmetrical at the two sides of the centre line A-A of the main body 10'. And they are at the middle of the pair of guiding blocks 131 and at the middle of the pair of spring arms 132. In the embodiment, the first through slot 106 and the second through slot 107 replace the pair of the through holes 111 of the first optical-fiber connector 10 for transmitting the test light. The test light from the first and second through slots 106, 107 acts as a measuring reference because of having no displacement of the light through a through slot. Thus, the two embodiments of the invention offer an accurate measuring reference to ensure optical signal transmission.

What is claimed is:

1. An optical-fiber connector, comprising:
    an insulative main body having a pair of optical components extending forwardly therefrom, each optical component defining at least one lens and a guiding post extending forwardly and located at outside of the lens;
    each guiding post defining a through hole extending through the guiding post and the main body in a front-to-back direction to service as a measure reference to test true position of the lens.

2. The optical-fiber connector as claimed in claim 1, wherein said through hole is round from a front view of the connector, the through holes and the guiding posts are overlapped at a centre thereof.

3. The optical-fiber connector as claimed in claim 2, wherein said main body defines a pair of guiding blocks extending along the front-to-back direction thereon and a pair of spring arms at two sides thereof.

4. The optical-fiber connector as claimed in claim 3, wherein said main body defines a plurality of receiving slot corresponding to the lenses, the through hole extends through the main body between the receiving slot and the spring arm.

5. An optical-fiber connector, comprising:
    a main body defining receiving slots running through a rear face thereof for receiving fiber cables;
    a pair of lenses disposed at a front face of the main body in a first direction perpendicular to a front-to-back direction of the connector, the lenses being aligned with and couple with the fiber cables;
    a pair of guiding posts disposed at two sides of the pair of lenses along a first direction;
    a measuring reference means provided in the main body or the guiding posts which run through a front face and rear face of the connector and is filled with air.

6. The optical-fiber connector as claimed in claim 5, wherein said main body defines a first through slot extending through the main body along the front-to-back direction and located between the pair of lenses, the first through slot recesses downwardly from a top face of the main body.

7. The optical-fiber connector as claimed in claim 6, wherein said first through slot is a right-angle slot directed with three edges from a front view of the connector.

8. The optical-fiber connector as claimed in claim 7, wherein said main body defines a second through slot opposite to the first through slot and recessing upwardly from a bottom face of the main body, the first through slot and the second through slot are symmetrical at two sides of a centre line of the main body.

9. The optical-fiber connector as claimed in claim 8, wherein said main body defines a pair of guiding blocks on the top face and a pair of spring arms at two sides thereof, the first and second through slots are at the middle of the pair of guiding blocks and at the middle of the pair of spring arms.

10. The optical-fiber connector as claimed in claim 5, wherein each guiding post defines a through hole extending through the guiding post and the main body in the front-to-back direction.

11. A method of measuring true component positions in an optical module, comprising steps of:
    providing an insulative main body with two pairs of internal blind holes therein, said two pairs of blind holes being spaced from each other and symmetrically located by two sides of a center line of said main body;
    providing a pair of alignment posts on two opposite outer sides of said two pairs of internal blind holes along a transverse direction; and
    providing a passage extending through either the post or a centerline area of the main body in a front-to-back direction perpendicular to said transverse direction.

12. The method as claimed in claim 11, further providing a pair of spring arms located by two opposite outer sides of said pair of alignment posts for locking the main body in a receiving cavity in an hybrid connector which includes electrical and optical ports thereof.

13. The method as claimed in claim 11, wherein said passage is essentially within the corresponding post while being exposed upon an exterior face of the main body.

* * * * *